United States Patent [19]
Maltese

[11] 3,821,800

[45] June 28, 1974

[54] RECORDER-REPRODUCER WITH SOLENOID-CONTROLLED RECORD AND REWIND OPERATIONS

[75] Inventor: John Maltese, Saddle Brook, N.J.

[73] Assignee: E.R.E. Laboratory, Inc., West Orange, N.J.

[22] Filed: Aug. 28, 1972

[21] Appl. No.: 283,943

[52] U.S. Cl. ........................ 360/62, 360/96, 360/105

[51] Int. Cl.... G11b 15/10, G11b 5/54, G11b 15/44

[58] Field of Search.... 274/11 C, 11 D, 11 A, 11 E, 274/4 C, 4 D; 242/198, 201; 179/100.2 Z

[56] References Cited

UNITED STATES PATENTS

| | | | |
|---|---|---|---|
| 3,531,575 | 9/1970 | Kobler et al. | 274/4 C |
| 3,603,595 | 9/1971 | Wada | 179/100.2 Z |
| 3,612,433 | 10/1971 | Patton | 242/201 |
| 3,724,859 | 4/1973 | Kobler et al. | 242/201 |

*Primary Examiner*—Bernard Konick
*Assistant Examiner*—David K. Moore
*Attorney, Agent, or Firm*—George H. Fritzinger

[57] ABSTRACT

A repeat magnetic tape recorder-reproducer has slide control means spring-urged to engage the record-reproduce head with the tape and to place the dirve mechanism in normal drive operation, and is operable by a remote-controlled power solenoid to disengage the head and to start the the drive mechanism in fast reqind. A record-reproduce switch has a lost-motion coupling with the slide control means causing the switch to be in reproduce position when the slide control means has been shifted by the power solenoid into reqind position and leaving the switch in reproduce position when the power solenoid is deactivated so that the recorder-reproducer is in operating reproduce condition at the end of each rewind operation. A remote control impulse solenoid is activatable during or after each deactivation of the power solenoid to place the recorder-reproducer in operating record condition.

5 Claims, 2 Drawing Figures

RECORDER-REPRODUCER WITH SOLENOID-CONTROLLED RECORD AND REWIND OPERATIONS

Figure 1:
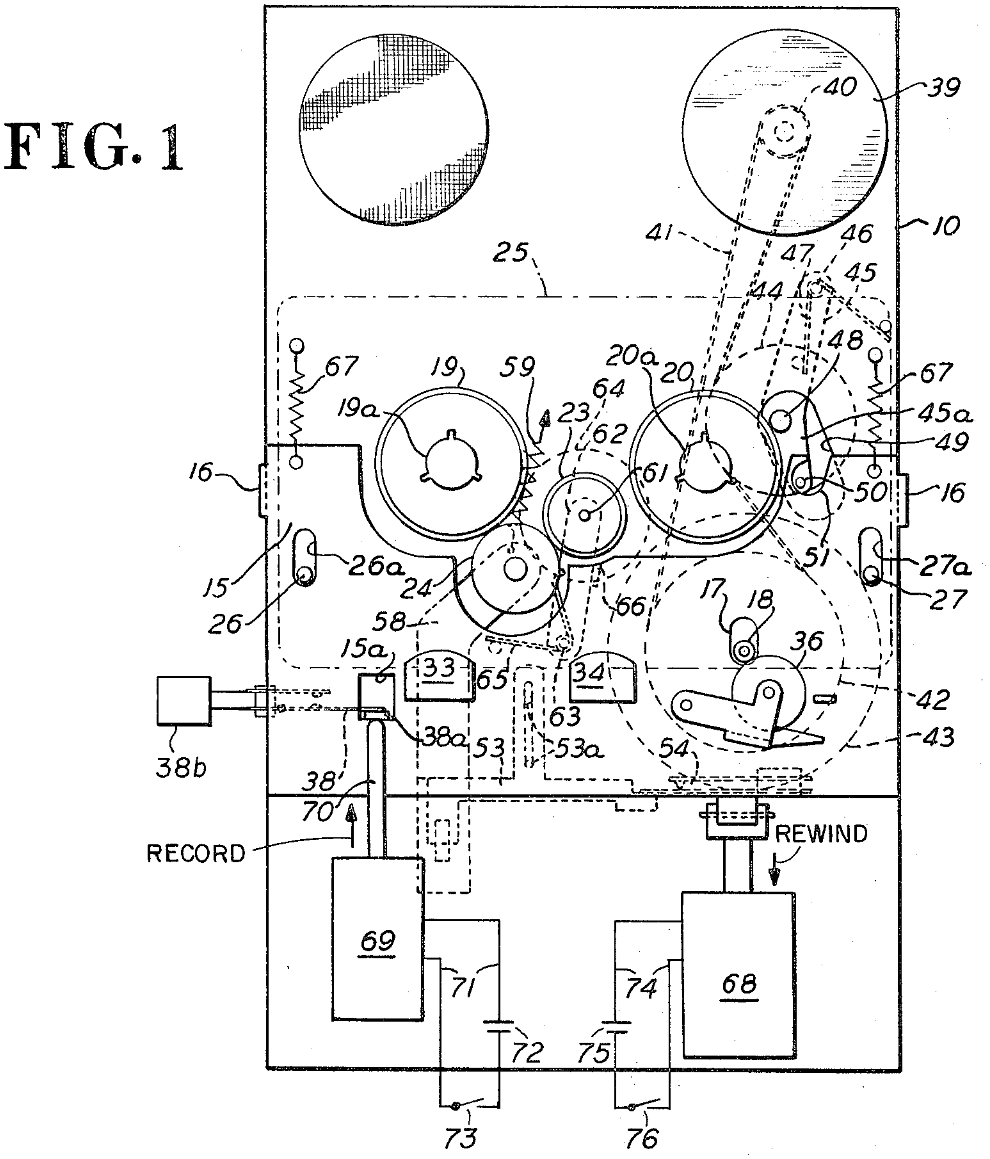

A repeat magnetic tape recorder-reproducer with slide control means for shifting the transducer head into engagement with the tape. Remote control means comprising first and second power solenoid means. Said first solenoid means shiftable to move said slide control means into rewind postion while said tape is rewound. Second impulse selonoid means operable to move a condition control member which closes a record-reproduce switch and puts said record-reproduce machine in record condition when said first solenoid means is not in operating condition.

The repeat recorder-reproducer described in the above-mentioned patent has a slide control plate on the chassis which carries the magnetic record-reproduce head into and out of the cartridge and shifts the drive mechanism into a normal operating condition for recording or reproducing and back into a fast rewind condition respectively, as the slide plate is shifted rearwardly and forwardly into operating and rewind positions. The normal operating condition of the machine is for reproducing but upon first depressing a record button and then shifting the slide plate rearwardly into operating position the machine is placed in an operating-record condition. As the slide plate is shifted to rewind position the magnetic head is removed from the cartridge and the machine returned to reproduce condition before the rewind operation is started.

An object of the invention is to provide such a repeat recorder-reproducer wherein the slide plate is shifted by a power solenoid and the record-reproduce switch is shifted by an impulse operation of a minor solenoid.

Another object is to provide such control system wherein the record-reproduce switch is in a freely mounted state and is impulsed by the minor solenoid into record position and returned to reproduce position by the slide plate as the latter is shifted into rewind position.

Another object is to provide such a system wherein the slide plate is spring-biased into operating position and is reversely actuated momentarily by the power solenoid at the end of each record and reproduce operation to rewind the tape immediately to start position.

Another object is to provide a lost-motion coupling between the record-reproduce switch and the slide plate which automatically returns the switch to reproduce position each time the rewind solenoid is operated, and which permits an impulse actuation of the switch to record position only when the slide plate is in its operating position.

Another object is to provide such a control system wherein a power rewind solenoid and a small record solenoid are actuatable from a remote control station by respective control signals to shift the machine between selective operating conditions for record and reproduce and an automatic rewind condition at the end of each record and reproduce operation.

These and other objects of my invention will be apparent from the following description and the appended claims.

Figure 2:
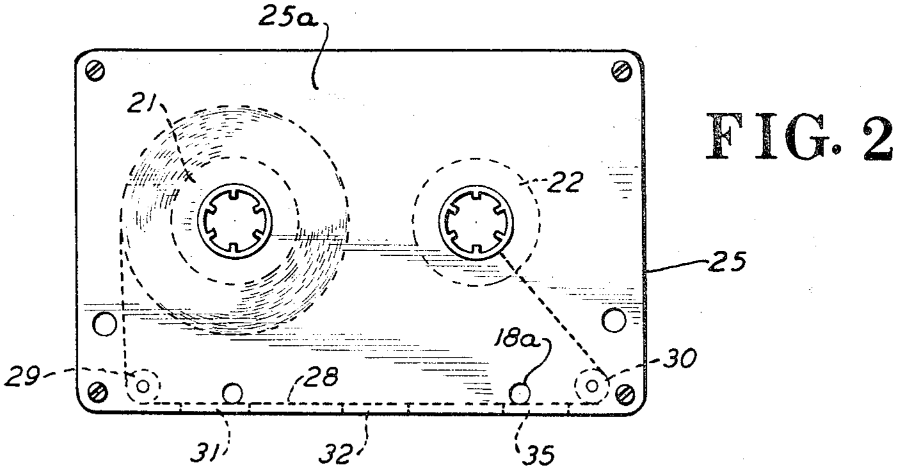

In the description of my invention reference is had to the accompanying drawings, of which:

FIG. 1 is a plan view of a cassette-type tape recorder-reproducer according to the invention, wherein the outer case is removed and the cassette is indicated only by dash-dot lines, and the recorder-reproducer is in operating reproduce condition; and FIG. 2 is a plan view of a typical cassette for the machine.

The recorder-reproducer has a rectangular chassis or frame 10 on the front portion of which there is a slide plate 15 guided by turned down lugs 16 at the sides. The slide plate has a clearance opening 17 for a tape drive capstan 18 and is cut out at the rear to clear a pair of friction drive wheels 19 and 20 for supply and take-up reels 21 and 22 and for a fast-forward friction wheel 23 and a rewind wheel 24. The reels are mounted in the left and right portions of a removable cartridge 25 having a plastic molded case 25*a* as shown in FIG. 2. The cartridge is pressed down onto a pair of locating pins 26 and 27 upstanding from the frame through clearance openings 26*a* and 27*a* in the slide plate 15. As the cartridge is so mounted the internal radial spokes on the hubs of the reels 21 and 22 are pressed onto respective rib-bed spindles 19*a* and 20*a* of the drive wheels 19 and 20 and the capstan 18 is projected through a clearance opening 18*a* in the case 25.

The magnetic tape 28 is drawn from the supply reel 21 around guide rollers 29 and 30 in the cartridge to the take-up reel 22. Portions of the run of the tape between the two guide rollers are exposed by front cutouts 31 and 32 in the cartridge to permit erase and record-reproduce heads 33 and 34 on the slide plate 15 to be moved into and out of the cartridge in engagement with the tape. These heads may be one unit with minimum spacing between the gaps if desired. Another cut-out 35 in the cartridge permits a spring loaded roller 36 on the slide plate to be moved into and out of the cartridge to place the tape into and out of driving engagement with the drive capstan 18.

The drive mechanism comprises a d. c. motor 39 having a drive pulley 40 at its lower end coupled by a belt 41 to a pulley 42 on a fly wheel 43. One run of the belt is led around a take-up pulley 44 journaled on a lever 45 pivoted at 46 to the frame 10. A torsion spring 47 urges the lever clockwise to keep the belt taut. A drive spindle 48 extends upwardly from the take-up pulley 44 through an oblong clearance opening 49 in the top wall of the frame. Also, an arm 45*a* extends from the lever 45 and carries a pin 50 which projects up through the opening 49. The pin 50 engages a cam slot 51 in the slide plate 15 to hold the spindle 48 away from the drive wheel 20 when the slide plate is in its forward or rewind position as will appear. The pin cam arrangement 50-51 also allows the spindle 48 to engage the wheel 20 responsive to the pressure of the spring 47 when the slide plate is in its rearward operative position.

The movement of the slide plate into its rearward operative position not only engages the spindle 48 and friction wheel 20 to provide a coupling from the drive motor 39 to the take-up reel to cause the latter to take-up the tape during play and record operations, but also (1) it engages the pressure roller 36 with the tape to couple the tape to the drive capstan 18, (2) it brings the erase and play-record heads 33 and 34 into engagement with the tape and (3) it moves a yoke 53 slidably mounted at 53*a* on the frame 15 to close an on/off switch 54 on the frame 15 to prepare the start circuit for the drive motor 39. Thus, the machine is started running in reproduce condition when the slide plate is in its operative position and the start-stop switch for the machine is closed.

The machine has a record-reproduce switch 38 operable by a button 38*a* which extends upwardly through an opening 15*a* in the slide plate 15. This switch 38 has a hinged pole member shiftable between a (open) reproduce position and closed record position and is connected to an audio system 38*b*, which may be of standard form, to connect the head 34 to operate as a recorder when the switch 38 is closed and as a reproducer when the switch is open. The slot 15*a* has such length and location that the button 38*a* engages the forward end of the slot when the slide plate is in its, operative position and the switch is in reproduce position as shown in FIG. 1 but the button 38*a* can then be moved rearwardly through the length of the slot into record positin. If the slide plate 15 is next actuated forwardly into rewind position the button 38*a* is shifted to reproduce position if it was not already there. When the slide plate is next shifted to its operative or record-reproduce position the machine will normally be in reproduce condition but the button 38*a* can be closed to shift the machine into the record condition. Further, when a rewind operation is next produced by shifting the slide plate forwardly the record condition is cancelled and the machine is left in reproduce condition at the end of rewind.

In order that a shift of the slide plate 15 into its forward rewind position will automatically place the machine in an operating rewind condition the yoke 53 is normally held in position to close the on-off switch 54 and a slide bar 58 on which the rewind roller 24 is journaled is biased rearwardly by a tension spring 59 to draw the rewind roller 24 between the idler roller 23 and the friction wheel 19 for the supply reel. The idler friction wheel 23 is journaled at 61 on a lever 62 pivoted at 63. Integral with the wheel 23 is a larger friction wheel 64 which rides on the fly wheel 43 responsive to the biasing of the lever 62 by a torsion spring 65. The engagement of the rewind roller 24 with the friction wheel 19 and idler friction wheel 23 couples the supply reel to the drive motor to draw the tape from the take-up reel 22 past the capstan 18 (the pinch roller 36 being not now engaged) to rewind the tape on the supply reel 21. But when the slide plate is moved into its rearward operative position a lug 66 thereon cams the lever 62 counterclockwise to disengage the friction wheel 64 from the fly wheel 43 so that the rewind drive becomes disengaged when the slide plate reaches its rearward operative position. But when the slide plate is shifted forwardly the lug 66 releases the lever 62 to engage the friction wheel 64 with the fly wheel 43 to start a fast rewind of the tape. When a rewind is completed the tape drive is jammed by reason of a closed end loop of tape on the take-up reel 22, and although the motor 39 will continue to run by reason of the on-off switch 54 being closed any continuing running of the motor which may be allowed to occur produces only a slippage of the motor drive pulley 40 on the belt 41.

In order to achieve the simple remote control operation of the machine as aforementioned the slide plate 15 is biased rearwardly into its operating position by two tension springs 67 which thus serve therefore normally to retain the machine in a reproduce operating condition. Coupled to the fore part of the slide plate is a rewind power solenoid 68 which when activated by a control circuit 74 having power source 75 and control switch 76 drives the slide plate forwardly to start instantaneous rewind of the tape to its start position. If the machine was in operating reproduce condition when rewind was started the control button 38*a* simply remains in its forward position so that when the rewind is ended and the power solenoid 68 deactivated the machine is left in reproduce condition. Thus, whenever the rewind solenoid is last actuated the machine is left in operating reproduce condition. To shift the machine into record condition there is provided a small impulse type solenoid 69 which when activated by a control circuit 71 having power source 72 and control switch 73 operates its plunger 70 rearwardly against the control button 38*a*. If the solenoid 69 is merely impulsed after the rewind solenoid is deactivated — i.e., the solenoid 69 is last actuated — the machine is in operating record condition. Thus, when the student has finished recording a bit of instructive material and a signal is fed momentarily to activate the central circuit 74 the tape will be automatically returned at fast speed to start position and the machine will be left in operating reproduce condition to repeat the part just recorded.

If on the other hand the solenoid 69 is impulsed after the tape is returned to start position the machine is placed in an operating record condition. This total control of the repeat machine by a momentary signal to operate the rewind power solenoid and an impulse signal to operate the record solenoid enables the machine to be easily operated from a remote station.

The embodiment of my invention herein particularly shown and described is intended to be illustrative and not necessarily limitative of my invention, since the same is subject to changes and modifications without departure from the scope of my invention which I endeavor to express according to the following claims.

I claim:

1. A repeat machine including a tape recorder-reproducer comprising supply and take-up reels, a drive motor, a forward drive mechanism for advancing a tape by said motor from said supply reel to said take-up reel during a record-reproduce operation, a rewind drive mechanism for coupling said supply reel in reverse direction to said drive motor at an above normal speed to return the tape to start position, drive control means for said machine shiftable between operating and rewind positions, a condition control member shiftable into record and reproduce positions for placing the machine respectively in record and reproduce conditions, means biasing said drive control means into operating position, a solenoid for shifting said drive control means into rewind position, and a coupling between said drive control means and said condition control member for placing said condition control member in reproduce position when said drive control means is in rewind position whereby upon deactivation of said solenoid said machine is in operating reproduce condition.

2. The repeat machine set forth in claim 1 including a solenoid rendered operable only when said drive control means is in operating position for shifting said condition control member into record position.

3. The repeat machine set forth in claim 2 wherein said coupling between said condition control member and said drive control means is effective to return said condition control member from record to reproduce position concurrently as said drive control means is shifted from operating to rewind positions.

4. A repeat tape recorder-reproducer comprising a cartridge having supply and take-up reels, a drive motor, a forward drive mechanism for advancing a tape by said motor from said supply reel to said take-up reel during a record-reproduce operation, a rewind drive mechanism for coupling said supply reel in reverse direction to said drive motor at an above normal speed to return the tape to start position, a magnetic record-reproduce head, a shiftable drive control plate carrying said magnetic head and coupled to said drive mechanisms for placing said machine in operating condition with said head in said cartridge for record or reproduce operation when said plate is shifted in one direction into operating position and for placing said machine in rewind condition with said head removed from said cartridge when said plate is shifted in the other direction into rewind position, spring means biasing said plate in operating position, a control button shiftable to place said machine selectively into record and reproduce conditions, said plate having an opening receiving said control button with play for shifting the button into reproduce position as said plate is shifted into rewind position and for allowing freedom for said button to be shifted into record position when said plate is in operating position, and a pair of solenoids a first of which is of dominating power and activatable to shift said plate against said spring means into rewind position and the second of which is activatable only when said first solenoid is not activated to shift said button into record position whereby (1) said machine is placed in operating reproduce condition when said first solenoid is the last momentarily actuated, (2) said machine is placed in operating record condition when said second solenoid is the last momentarily actuated, and (3) said machine is placed in rewind condition when said first solenoid is held actuated.

5. A remotely controlled repeat type magnetic tape machine comprising a cartridge having supply and take-up reels, drive means selectively conditionable to advance said tape at normal speed for record-reproduce operation and for fast rewind of said tape back to start position, a record-reproduce control switch and audio system for shifting the machine into record and reproduce conditions, a magnetic head, a drive control member carrying said magnetic head and coupled to said switch and drive means for movement into an operating position to shift said head into said cartridge said control member allowing, freedom for said switch to be shifted between record and reproduce positions and for starting said normal forward drive of the tape, and said drive control member being movable back into a rewind position to remove said head from said cartridge, place said switch in reproduce position and start fast rewind of the tape, spring means biasing said drive control member into operating position, and remote control means comprising a first power solenoid for shifting said drive control means into rewind position, a second impulse solenoid operable for shifting said record-reproduce switch to record position when said first solenoid is not operated, and first and second control circuits for said respective solenoids whereby upon said first control circuit being the last momentarily activated and said second circuit deactivated said machine is placed in operating reproduce condition, upon said second control circuit being the last momentarily activated and said first circuit deactivated said machine is placed in operating record condition, and upon said first control circuit being held activated said machine is held in rewind condition.

* * * * *